(12) United States Patent
Stiba

(10) Patent No.: US 8,070,180 B2
(45) Date of Patent: Dec. 6, 2011

(54) STROLLER AND SHOPPING CART

(76) Inventor: Leslie Stiba, Pfugerville, TX (US)

( * ) Notice: Subject to any disclaimer, the term of this patent is extended or adjusted under 35 U.S.C. 154(b) by 183 days.

(21) Appl. No.: 12/145,326

(22) Filed: Jun. 24, 2008

(65) Prior Publication Data
US 2009/0315300 A1    Dec. 24, 2009

(51) Int. Cl.
*B62B 3/02* (2006.01)
(52) U.S. Cl. .............. 280/648; 280/638; 280/47.38
(58) Field of Classification Search .............. 280/638, 280/35, 639, 642, 643, 647, 648, 650, 651, 280/656, 657, 658, 47.34, 47.38, 47.41
See application file for complete search history.

(56) References Cited

U.S. PATENT DOCUMENTS

| | | | | |
|---|---|---|---|---|
| 5,312,122 A * | 5/1994 | Doty | ............... | 280/33.992 |
| 6,523,840 B1 * | 2/2003 | Koppes et al. | ............... | 280/47.35 |
| 6,676,140 B1 * | 1/2004 | Gondobintoro | ............... | 280/33.993 |
| 6,976,697 B2 * | 12/2005 | Britton et al. | ............... | 280/647 |
| 7,624,954 B2 * | 12/2009 | Randle et al. | ............... | 248/129 |
| 2008/0238011 A1 * | 10/2008 | Hammel et al. | ............... | 280/47.34 |
| 2009/0236826 A1 * | 9/2009 | Queen | ............... | 280/650 |

\* cited by examiner

*Primary Examiner* — J. Allen Shriver, II
*Assistant Examiner* — John Walters

(57) ABSTRACT

A stroller for carrying a user or multiple users may include a first and second front frame member for supporting a seat or seats and back support member, a first and second back frame member being detachably connected to the first and second front frame member, an expandable base member which connects between the first and second front frame member and the first and second back frame member. The expandable frame member may move between an extended and a retracted position to provide a storage area. The first and second back frame member may include handles, and the first and second front frame members may include an upper section and a lower section. The upper section may pivot with respect to the lower section, and the first and second back frame members may pivot with respect to the extendable base member. The first and second front frame members may pivot with respect to the extendable base member.

6 Claims, 4 Drawing Sheets

STROLLER AND SHOPPING CART

FIELD OF THE INVENTION

The present invention relates to baby strollers and more particularly to a baby stroller which can be expanded to provide a storage area.

BACKGROUND

Baby strollers have been known and used for a number of years in order to provide a comfortable apparatus to move a baby or small child. The trend in baby strollers has been to reduce the size of the baby stroller in order to provide for a device that can be placed in a vehicle easily. However, reducing the size of the baby stroller has also reduced or eliminated the amount of storage area that is available for purchases while shopping with the baby stroller or for storing the needs of the baby. There remains a need for a baby stroller that can accommodate a large amount of packages or baby needs and yet can be easily stored within a vehicle.

U.S. Reissue Pat. No. 6,657 issued on Sep. 28, 1875, to A. W. Daby describes a children's carriage having a shape of a swan with a canopy and rear handle supported by sills resting on a pair of ornate springs attached to the axles. The carriage is distinguishable for its requirement for spring action.

U.S. Pat. No. 2,539,236 issued on Jan. 23, 1952, to Evelyn Dore describes a bird-shaped baby carriage with two folding seats, which face each other in the body cavity. The carriage has a bird head with a hollow neck for storing items, large wings, a rear handle decorated with small birds, and angularly bent legs resting on the chassis frame supported by four wheels. The carriage is distinguishable for its required folding opposed seats.

U.S. Pat. No. 3,967,833 issued on Jul. 6, 1976, to Henry Fleischer describes a portable baby holding device which may take the form of a combination baby carriage, stroller, infant seat, car seat, car bed, bassinet, and high chair. The device has a canopy completely covering the baby and a collapsible frame comprising a horizontal primary tubular support having hook-like members angling upward and rearward, i.e., push handle, and supported by an upper cross member and extendible cross members supporting the rear wheels. Front caster wheels support the front portion of the primary tubular support. The device is distinguishable for its required horizontal primary tubular support.

U.S. Pat. No. 4,678,196 issued on Jul. 7, 1987, to Kip Van Steenberg describes a child car seat superstructure apparatus convertible into a stroller comprising a super-structure shell having a pair of longitudinally extending arms, a U-frame rear pusher bar rotatable forward by a rack type positioner, a base frame with four wheels supporting the removable seat and adjustable chair back. The apparatus is distinguishable for requiring a superstructure to accommodate only a single infant.

U.S. Pat. No. 4,828,281 issued on May 9, 1989, to David K. Sanchas describes a convertible car seat to a stroller apparatus comprising a latched together two-piece hollow seat structure having a seat belt on the upper portion across the wings, and openings in the lower portion for the vehicle's seat belt. For forming the stroller, the lower portion is removed to lower the folded perimeter framework supporting four wheels via an inner and outer scissors link. An enclosed U-shaped handle is pivoted upward in the rear. The apparatus is distinguishable for being limited to accommodate one infant and requiring a perimeter frame for the wheels.

U.S. Pat. No. 4,878,680 issued on Nov. 9, 1989, to Terrence O. Molnar describes a convertible car seat and stroller combination apparatus comprising a padded child's seat having a telescopic U-shaped handle extending upward from behind the back of the seat, and a perimeter frame having four wheels extendible downward. The apparatus is distinguishable for being limited to one occupant and requiring a perimeter frame for the wheels.

U.S. Pat. No. 4,896,894 issued on Jan. 30, 1990, to David L. Singletary describes a stroller car seat apparatus comprising a conventional infant seat having a safety harness, a U-shaped padded front guard bar, a U-shaped telescoping handle in the rear, a pivoting front footrest, and a folding rectangular scissors framework with four wheels. The apparatus is distinguishable for being limited to one child and requiring an obtrusive lower framework.

U.S. Pat. No. 5,104,134 issued on Apr. 14, 1992, to Richard E. Cone describes a convertible child's combination car seat and stroller apparatus comprising a molded plastic shell with lower door panels for including a four-wheel assembly on front and rear pivoting legs. The two front wheels can rotate, but the rear wheels are doubled. A telescopic handle is mounted in the shell. The apparatus is distinguishable for being limited to one child and can only be placed on a vehicle seat backwards.

U.S. Pat. No. 5,318,311 issued on Jun. 7, 1994, to Julio A. Bofill describes a combination child vehicle seat and stroller apparatus comprising a hollow chair shaped shell having two telescopic handles with bent handle grips on top of the seatback, two side portions having notches to position the vehicle's seatbelt, and retractable wheel assemblies which form a smooth bottom surface of the apparatus. The apparatus is distinguishable for being limited to a child and requiring retractable wheel assemblies and a pair of telescopic handles.

U.S. Pat. No. 5,360,221 issued on Nov. 1, 1994, to Yoon S. Chai describes a baby carriage convertible to a safety car seat with a harness comprising a body assembly including a seat, a back, a footrest, and side plates. A wheel assembly is pivotally mounted on the body assembly and adapted to be folded back. A handle assembly is pivotally mounted on the body assembly and adapted to be rotated into a horizontal position. A locking assembly locks and releases the wheel assembly. When the carriage is converted into a safety seat, the wheel assembly is released and folded back, and the handle assembly is rotated into a horizontal position to be used as an arm rest plate. The apparatus is distinguishable for being limited to one baby, and requiring the rotation of the handle assembly to serve as an arm rest.

U.S. Pat. No. 5,398,951 issued on Mar. 21, 1995, to Choon W. Ryu describes a convertible child car seat and stroller apparatus comprising a molded plastic safety seat with a forwardly rotatable U-shaped handle, and a collapsible wheel assembly positioned outside the safety seat. The apparatus is distinguishable for being limited to one child and having an exposed folded wheel assembly.

U.S. Pat. No. 5,478,096 issued on Dec. 26, 1995, to Chien Ting describes a collapsible multi-use baby carriage having a structure transformable into a dining chair, a safety seat in a car, a cradle, and a bed comprising a seat, a backrest pivotally connected with the seat to change the angle of the backrest, a U-shaped hand rest pivotally connected with the backrest. The structure has a pushing handle, two opposite telescopic side tubes with a windable support plate between the side tubes, and windable on a winding tubular shaft housed in a front tube of the hand rest for pulling out for supporting food. Two front and rear casters are pivotally connected with the bottom of the seat and foldable to the seat bottom. The carriage is distinguishable for being limited to one infant, and requiring a windable support plate and two opposite side tubes.

U.K. Patent Application No. GB 2 211 08 2A published on Jun. 28, 1989, describes an interchangeable infant's seat used as either a car seat or a pram seat comprising a rigid right-angled lightweight chassis left in the car and a pram chassis which accommodates the interchangeable right-angled seat by the car seat belt and clips in the car and by clips in the pram. The device is distinguishable for being limited to one infant and requiring separate car seat and pram supports.

U.K. Patent Application No. GB 2 254 587 A published on Oct. 14, 1992, describes a child seat convertible into a push-chair comprising a seat in a supporting frame adapted to be mounted in a vehicle and on a wheeled frame having releasably mounting parts on each side of the seat and the frame. The carrier is distinguishable for being limited to one infant.

U.K. Patent Application No. GB 2 262 914 A published on Jul. 7, 1993, describes a molded child seat for a vehicle and convertible into a pushchair comprising a supporting frame having two triangular lateral sub-frames interconnected by cross rails. Each sub-frame is equipped with a pair of mounting pins adapted to engage with appropriately shaped and positioned slots on the wheeled pushchair frame. The apparatus is distinguishable for being limited to one infant and requiring a supporting frame.

Other patents include U.S. Pat. No. 6,679,506 discloses a combined shopping cart stroller having cargo carrying and passenger carrying capabilities. The shopping cart stroller comprises a frame supported on wheels for rolling movement, a seat mounted to the frame and being shiftable between an unfolded position in which the seat is positioned to support the passenger and a folded position in which the folded seat defines a portion of a forward cargo area, a rearward cargo area defined by a rearward portion of the frame, and a lower cargo area defined by a lower portion of the frame.

U.S. Pat. No. 5,544,904 discloses a convertible stroller and shopping cart having a stroller portion and a shopping cart portion. The stroller portion includes a seat secured to a metal frame, and the shopping cart portion comprises a collapsible receptacle. The receptacle can be oriented in two orientations, a stowed orientation adjacent the seat and a deployed orientation over the seat. When the receptacle is deployed, it conforms to the seat, creating a shopping cart from the stroller.

U.S. Pat. No. 6,669,212 discloses a cart having a frame member including upright and lateral frame portions. A platform is attached to the lateral frame portion and a stationary seat assembly is secured to the upright frame portion. The stationary seat assembly includes a rearwardly facing stationary seat, a handle and a safety bar between the seat and the handle. A pivoting mechanism is mounted to the lateral frame portion remote from the upright frame portion. The pivoting mechanism is moveable between a substantially upright position and a retracted position and is located relative to a back portion of the seat. A flexible receptacle is attached to the pivoting mechanism, and moves between an open and collapsed position when the pivoting mechanism is moved between the substantially upright and the retracted position, respectively. The stationary seat and the platform are accessible when the pivoting mechanism is in the substantially upright position or the retracted position.

U.S. design Pat. D478,198 discloses a combined shopping cart/stroller.

U.S. Pat. No. 6,523,840 discloses a combined shopping cart stroller having cargo carrying and passenger carrying capabilities. The shopping cart stroller comprises a frame supported on wheels for rolling movement, a seat mounted to the frame and being shiftable between an unfolded position in which the seat is positioned to support the passenger and a folded position in which the folded seat defines a portion of a forward cargo area, a rearward cargo area defined by a rearward portion of the frame, and a lower cargo area defined by a lower portion of the frame.

U.S. design Pat. D470,084 discloses a convertible stroller and shopping cart having an 'X' frame.

U.S. design Pat. D465,632 discloses a combined shopping cart/stroller.

U.S. Pat. No. 6,378,891 discloses a convertible stroller and shopping vehicle having a stroller portion and a shopping vehicle portion. The stroller portion includes a seat which is movable from a deployed position to a stowed position. In the deployed position, the invention is used as a stroller. The shopping vehicle portion includes a collapsible receptacle that can be oriented in one of two orientations. In an open orientation, the receptacle creates a shopping cart while in a collapsed orientation the invention can be used to transport bulk materials.

U.S. Pat. No. 6,170,854 discloses a convertible stroller and shopping vehicle having a stroller portion and a shopping vehicle portion. The stroller portion includes a seat which is movable from a deployed position to a stowed position. In the deployed position, the invention is used as a stroller. The shopping vehicle portion includes a collapsible receptacle that can be oriented in one of two orientations. In an open orientation, the receptacle creates a shopping cart while in a collapsed orientation the invention can be used to transport bulk materials.

U.S. Pat. No. 7,229,083 discloses a stroller includes a stroller body and a basket support mechanism. The stroller body has two front legs, two rear legs, a handle, and a seat support part. The basket support mechanism has a basket support member disposed below the rear legs of the stroller body, and a flexible member disposed between the basket support member and a front upper part of the stroller body.

U.S. Pat. No. 7,226,059 discloses a cart including a frame and a rigid base section horizontally registered above a ground level and oriented parallel thereto. Casters are mated to opposed corners of the base section. An upper section is pivotally conjoined to opposed corners of the base section and is offset along a vertical plane. The upper section is spaced from the casters. A collection bin is centrally housed within the upper section and seated on the base section. The bin is arranged so that the upper section abuts proximal and distal top ends of the bin. Clamping arms are anchored to a distal end of the base section and spaced from the upper section respectively. The upper section and the clamping arms are simultaneously and independently articulated during operating conditions.

SUMMARY

A stroller for carrying a user may include a first and second front frame member for supporting a seat and back support member, a first and second back frame member being detachably connected to the first and second front frame member, an expandable base member which connects between the first and second front frame member and the first and second back frame member. The expandable frame member may move between an extended and a retracted position to provide a storage area.

The first and second back frame member may include handles, and the first and second front frame members may include an upper section and a lower section.

The upper section may pivot with respect to the lower section, and the first and second back frame members may pivot with respect to the extendable base member.

The first and second front frame members may pivot with respect to the extendable base member.

BRIEF DESCRIPTION OF THE DRAWINGS

The invention may be understood by reference to the following description taken in conjunction with the accompanying drawings, in which, like reference numerals identify like elements, and in which.

DETAILED DESCRIPTION

Figure 1:
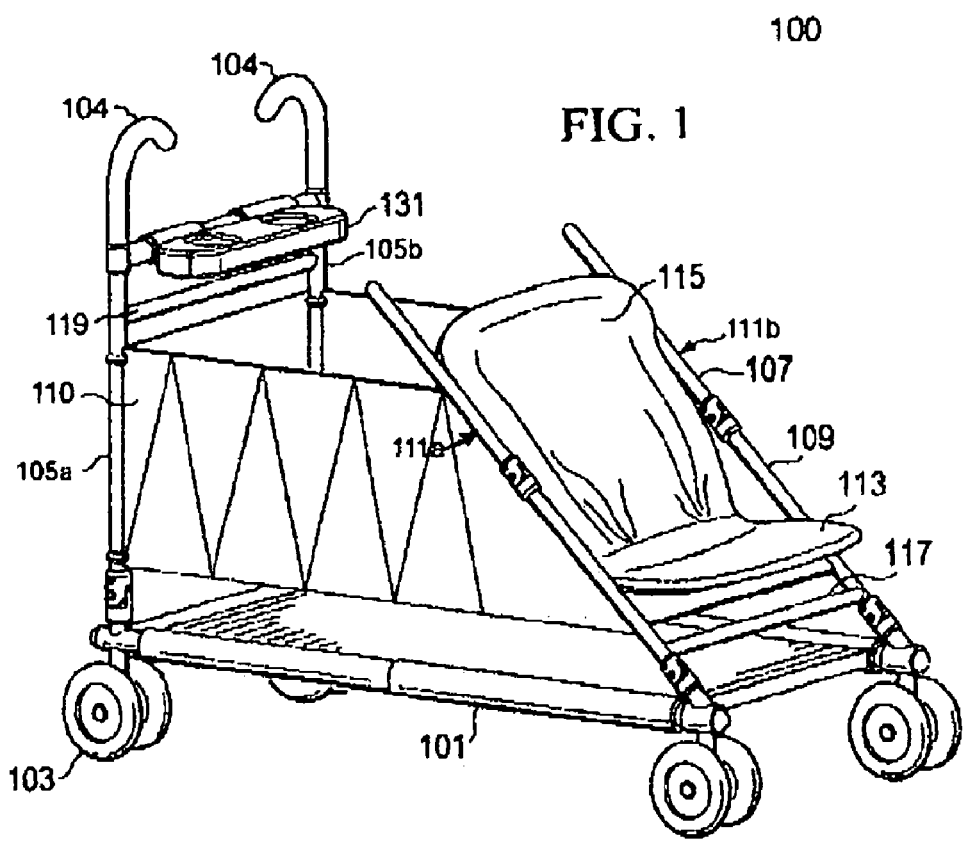
FIG. 1 illustrates a perspective view of the baby stroller in an expanded position.

FIG. 1 illustrates a stroller 100 in accordance with the teachings of the present invention. FIG. 1 illustrates an expandable base member 101 which may expand in the longitudinal direction for example by telescoping (retracting and extending) a first portion of the expandable base member 101 with a second portion of the expandable base member 101. FIG. 1 illustrates the expandable base member 101 being substantially in an expanded position in order to provide a storage area to accommodate packages and even small passengers or users. FIG. 1 illustrates that the expandable base member 101 is attached to wheel members 103 at substantially at each peripheral corner of the expandable base member 101. The expandable base member 101 and the wheel member 103 may be affixed to a first back frame member 105 and a second back frame member 105 which are substantially vertical and which is shown as a rod having inward curving handles 104 at the upper end of the first back frame member 105 and the second back frame member 105. The first back frame member 105 and the second back frame member 105 may be formed from metal or plastic or other suitable material. FIG. 1 additionally illustrates a first front frame member 111 and a second front frame member 111 which is shown as being inclined at an acute angle with respect to the expandable base member 101. The first front frame member and the second front frame member 111 may be formed from metal or plastic or suitable material. The first front frame member 111 and the second front frame member 111 include an upper section 107 and a lower section 109 to allow the upper section 107 to be pivoted with respect to the lower section 109 to allow the first front frame member 111 and the second front frame member 111 to be folded and stored. The first front frame member 111 and the second front frame member 111 are affixed to the expandable base member 101. FIG. 1 additionally illustrates a seat member 113 to provide a seat for the user of the stroller 100 which is positioned traverse to the first front frame member 111 and the second front frame member 111 and may be pivotable for storage, and FIG. 1 additionally illustrates a back support member 115 to support the back of the user. The seat member 113 and the back support member 115 may be formed from flexible material. A front traverse member 117 extends substantially horizontally between the first front frame member 111 and the second front frame member 111 to support the first front frame member 111 and the second front frame member 111. Furthermore, FIG. 1 illustrates a back traverse member 119 which extends vertically between the first back frame member 105 and the second back frame member 105 to support the first back frame member 105 and the second back frame member 105. The position of the back traverse member 119 can be adjusted up and down. A cup holder apparatus 131 extends substantially vertically between the first back frame member 105 and the second back frame member 105.

FIG. 1 illustrates a expandable basket apparatus 110 which extends in between the first and second front frame member 111 and the first and second back frame member 105 respectively. The expandable basket apparatus 110 is sturdy and may be constructed from metal or plastic or other suitable material.

FIG. 1 additionally illustrates that the stroller 100 is in an open position by which the expandable base member 101 has been extended such that the upper ends of the first and second front frame member 111 has become disconnected from the first and second back frame member 105 respectively.

Figure 2:
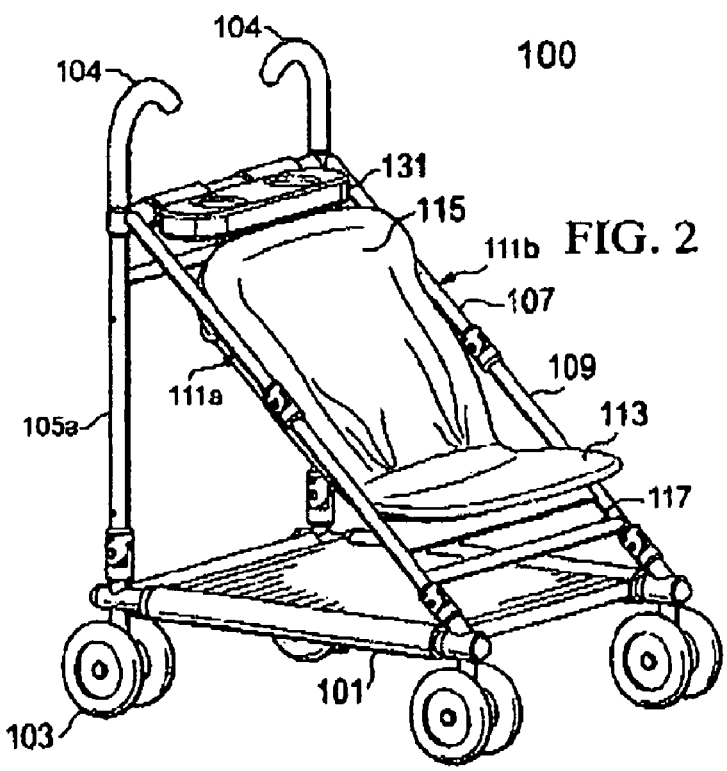
FIG. 2 illustrates a perspective view of the baby stroller in a retracted position.

FIG. 2 illustrates a stroller 100 in accordance with the teachings of the present invention. FIG. 2 illustrates an expandable base member 101 which may expand in the longitudinal direction for example by telescoping (retracting and extending) a first portion of the expandable base member 101 with a second portion of the expandable base member 101. FIG. 2 illustrates the expandable base member 101 being substantially in an retracted position in order to operate as a stroller 100. FIG. 2 illustrates that the expandable base member 101 is attached to wheel members 103 at substantially at each peripheral corner of the expandable base member 101. The expandable base member 101 and the wheel member 103 may be affixed to a first hack frame member 105 and a second back frame member 105 which are substantially vertical and which is shown as a rod having inward curving handles 104 at the upper end of the first back frame member 105 and the second back frame member 105. FIG. 2 additionally illustrates a first front frame member 111 and a second front frame member 111 which is shown as being inclined at an acute angle with respect to the expandable base member 101. The first front frame member 111 and the second front frame member 111 includes a upper section 107 and a lower section 109 to allow the upper section 107 to be pivoted with respect to the lower section 109 to allow the first front frame member 111 and the second front frame member 111 to be folded and stored. The first front frame member 111 and the second front frame member 111 are affixed to the expandable base member 101. FIG. 1 additionally illustrates a seat member 113 to provide a seat for the user of the stroller 100 which is positioned traverse to the first front frame member 111 and the second front frame member 111 and may be pivotal for storage, and FIG. 1 additionally illustrates a back support member 115 to support the back of the user. The seat member 113 and the back support member 115 may be formed from flexible material. A front traverse member 117 extends substantially horizontally between the first front frame member 111 and the second front frame member 111 to support the first front frame member 111 and the second front frame member 111. Furthermore, FIG. 2 illustrates a back traverse member 119 which extends vertically between the first back frame member 105 and the second back frame member 105 to support the first back frame member 105 and the second back frame member 105. The position of the back traverse member 119 can be adjusted by raising and lowering the back traverse member 119. A cup holder apparatus 131 extends substantially vertically between the first back frame member 105 and the second back frame member 105 and is adjustable to either in front of or behind the first and second frame members 105.

FIG. 2 additionally illustrates that the stroller 100 is in a closed position by which the expandable base member 101 has been retracted such that the upper ends of the first and second front frame member 111 has become connected to the first and second back frame member 105 respectively.

Figure 3:
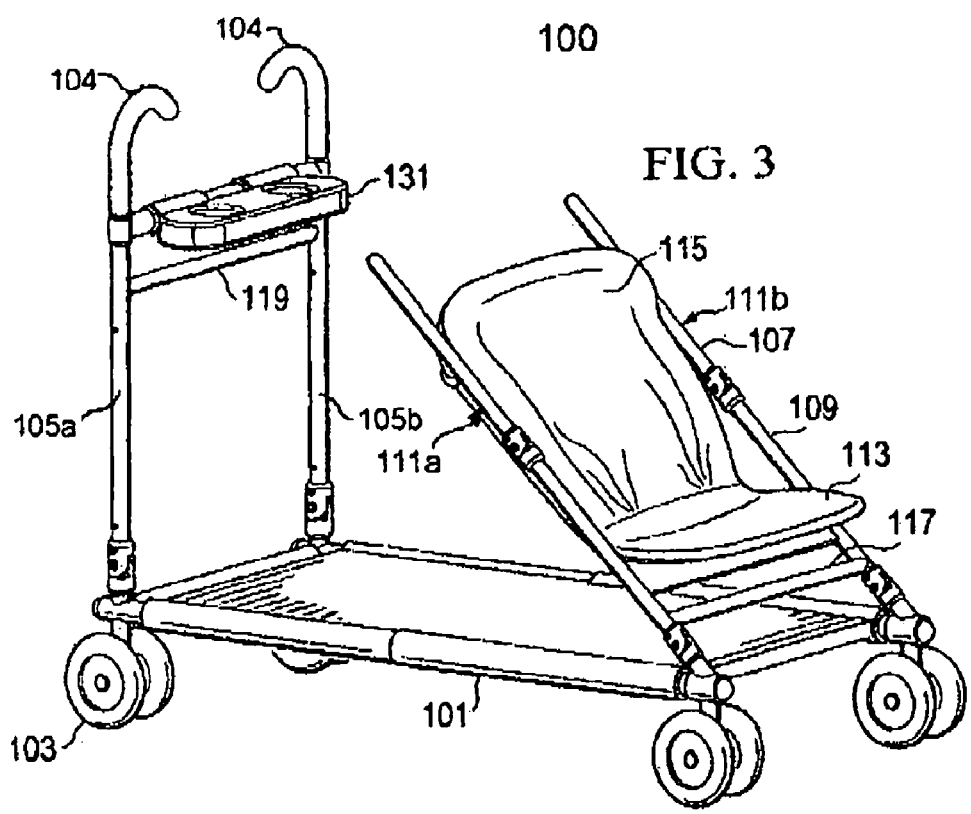
FIG. 3 illustrates a perspective view of the baby stroller with only the base portion expanded.

FIG. 3 illustrates a stroller 100 in accordance with the teachings of the present invention. FIG. 3 illustrates an expandable base member 101 which may expand in the longitudinal direction for example by telescoping (retracting and extending) a first portion of the expandable base member 101 with a second portion of the expandable base member 101. FIG. 3 illustrates the expandable base member 101 being substantially in an expanded position in order to accommodate packages and even small passengers or users. FIG. 3 illustrates that the expandable base member 101 is attached to wheel members 103 at substantially at each peripheral corner of the expandable base member 101. The expandable base member 101 may be formed from metal such as steel or plastic or any other suitable material. The wheel member 103 may be formed from metal or plastic or other suitable material and may rotate in order to provide greater mobility or may be fixed to travel in the forward direction or a combination.

The expandable base member 101 and the wheel member 103 may be affixed to a first back frame member 105 and a second back frame member 105 which are substantially vertical and which is shown as a rod having inward curving handles 104 at the upper end of the first back frame member 105 and the second back frame member 105. The first back frame member 105 and the second back frame member 105 may be formed from metal or plastic or other suitable material. FIG. 3 additionally illustrates a first front frame member 111 and a second front frame member 111 which is shown as being inclined at an acute angle with respect to the expandable base member 101. The first front frame member 111 and the second front frame member 111 includes a upper section 107 and a lower section 109 to allow the upper section 107 to be pivoted with respect to the lower section 109 to allow the first front frame member 111 and the second front frame member 111 to be folded and stored. The first front frame member 111 and the second front frame member 111 are affixed to the expandable base member 101. FIG. 3 additionally illustrates a seat member 113 to provide a seat for the user of the stroller 100 which is positioned traverse to the first front frame member 111 and the second front frame member 111 and may be pivotable for storage, and FIG. 3 additionally illustrates a back support member 115 to support the back of the user. A front traverse member 117 extends substantially horizontally between the first front frame member 111 and the second front frame member 111 to support the first front frame member 111 and the second front frame member 111. Furthermore, FIG. 3 illustrates a back traverse member 119 which extends vertically between the first back frame member 105 and the second back frame member 105 to support the first back frame member 105 and the second back frame member 105. The position of the back traverse member 119 may be adjusted up or down. A cup holder apparatus 131 extends substantially vertically between the first back frame member 105 and the second back frame member 105.

FIG. 3 illustrates that the expandable basket apparatus 110 has been retracted to a stowed position.

FIG. 3 additionally illustrates that the stroller 100 is in an open position by which the expandable base member 101 has been extended such that the upper ends of the first and second front frame member 111 has become disconnected from the first and second back frame member 105 respectively.

Figure 4:
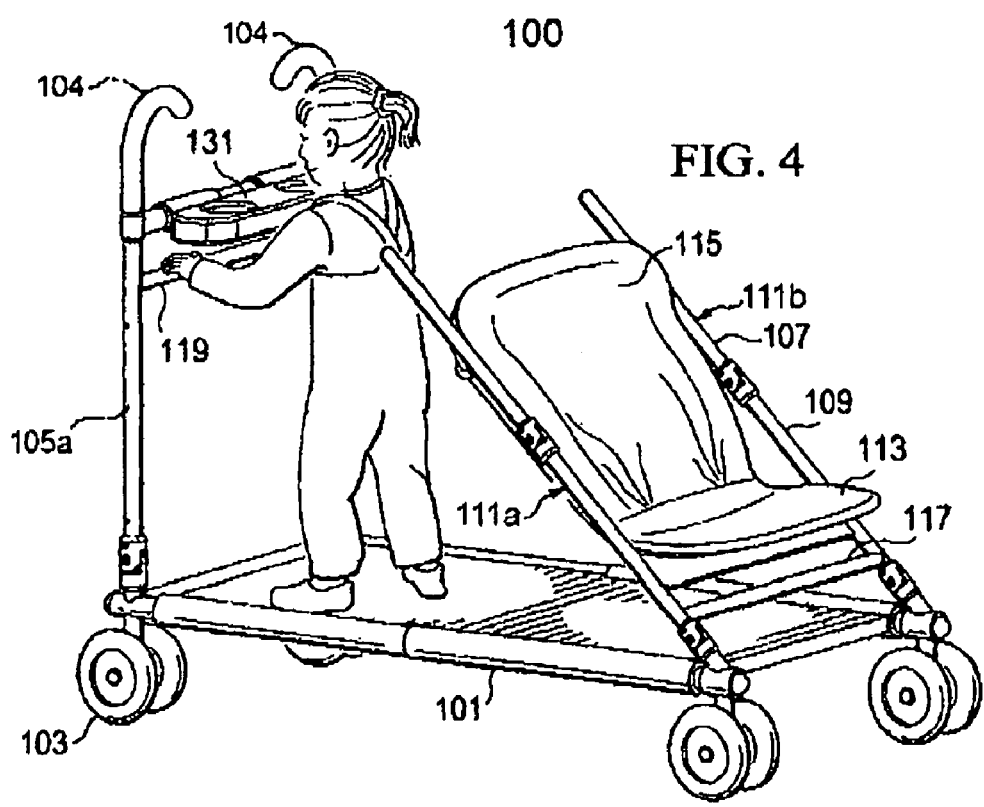
FIG. 4 illustrates a perspective view of the baby stroller with only the base portion expanded.

FIG. 4 illustrates a stroller 100 in accordance with the teachings of the present invention. FIG. 4 illustrates an expandable base member 101 which may expand in the longitudinal direction for example by telescoping (retracting and extending) a first portion of the expandable base member 101 with a second portion of the expandable base member 101. FIG. 4 illustrates the expandable base member 101 being substantially in an expanded position in order to accommodate packages and even small passengers or users. FIG. 4 illustrates that the expandable base member 101 is attached to wheel members 103 at substantially at each peripheral corner of the expandable base member 101. The expandable base member 101 may be formed from metal such as steel or plastic or any other suitable material. The wheel member 103 may be formed from metal or plastic or other suitable material and may rotate in order to provide greater mobility or may be fixed to travel in the forward direction or a combination.

The expandable base member 101 and the wheel member 103 may be affixed to a first back frame member 105 and a second back frame member 105 which are substantially vertical and which is shown as a rod having inward curving handles 104 at the upper cod attic first back frame member 105 and the second back frame member 105. The first back frame member 105 and the second back frame member 105 may be formed from metal or plastic or other suitable material. FIG. 4 additionally illustrates a first front frame member 111 and a second front frame member 111 which is shown as being inclined at an acute angle with respect to the expandable base member 101. The first front frame member 111 and the second front frame member 111 includes a upper section 107 and a lower section 109 to allow the upper section 107 to be pivoted with respect to the lower section 109 to allow the first front frame member 111 and the second front frame member 111 to be folded and stored. The first front frame member 111 and the second front frame member 111 are affixed to the expandable base member 101. FIG. 4 additionally illustrates a seat member 113 to provide a seat for the user of the stroller 100 which is positioned traverse to the first front frame member 111 and the second front frame member 111 and may be pivotable for storage, and FIG. 4 additionally illustrates a back support member 115 to support the back of the user. A front traverse member 117 extends substantially horizontally between the first front frame member 111 and the second front frame member 111 to support the first front frame member 111 and the second front frame member 111. Furthermore, FIG. 4 illustrates a back traverse member 119 which extends vertically between the first back frame member 105 and the second back frame member 105 to support the first back frame member 105 and the second back frame member 105. A cup holder apparatus 131 extends substantially vertically between the first back frame member 105 and the second back frame member 105 and is shown in an adjusted position move behind the first and second back frame members 105.

FIG. 4 illustrates that the expandable basket apparatus has been retracted to a stowed position.

FIG. 4 additionally illustrates that the stroller 100 is in an open position by which the expandable base member 101 has been extended such that the upper ends of the first and second front frame member 111 has become disconnected from the first and second back frame member 105 respectively. FIG. 4 illustrates a user standing on the expandable base member 101. Although a single user is shown, multiple users could stand or sit on the expandable base member 101. Furthermore, packages could be stowed on the expandable base member 101 with or without users.

Figure 5:
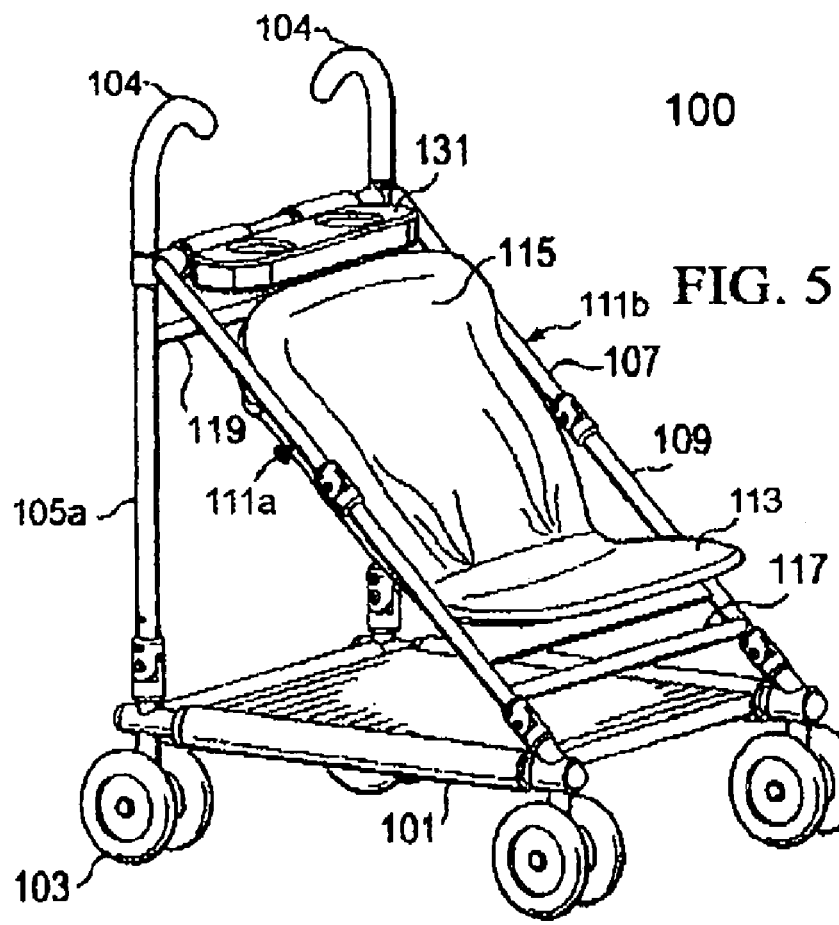
FIG. 5 illustrates a perspective view of the baby stroller in a retracted and unfolded position.

FIG. 5 illustrates a stroller 100 in accordance with the teachings of the present invention. FIG. 5 illustrates an expandable base member 101 which may expand in the longitudinal direction for example by telescoping (retracting and extending) a first portion of the expandable base member 101 with a second portion of the expandable base member 101. FIG. 5 illustrates the expandable base member 101 being substantially in a retracted position in order to operate as a stroller 100. FIG. 5 illustrates that the expandable base member 101 is attached to wheel members 103 at substantially at each peripheral corner of the expandable base member 101.

The expandable base member 101 and the wheel member 103 may be affixed to a first back frame member 105 and a second back time member 105 which are substantially vertical and which is shown as a rod having inward curving handles 104 at the upper end of the first back frame member 105 and the second back frame member 105. FIG. 5 additionally illustrates a first front frame member 111 and a second front frame member 111 which is shown as being inclined at an acute angle with respect to the expandable base member 101. The first front frame member 111 and the second front frame member 111 includes a upper section 107 and a lower section 109 to allow the upper section 107 to be pivoted with respect to the lower section 109 to allow the first front frame member 111 and the second front frame member 111 to be folded and stored. The first front frame member 111 and the second front frame member 111 are affixed to the expandable base member 101. FIG. 5 additionally illustrates a seat member 113 to provide a seat for the user of the stroller 100 which is positioned traverse to the first front frame member 111 and the second front frame member 111 and may be pivotal for storage, and FIG. 1 additionally illustrates a back support member 115 to support the back of the user. The seat member 113 and the back support member 115 may be formed from flexible material. A front traverse member 117 extends substantially horizontally between the first front frame member 111 and the second front frame member 111 to support the first front frame member 111 and the second front frame member 111. Furthermore, FIG. 5 illustrates a back traverse member 119 which extends vertically between the first back frame member 105 and the second back frame member 105 to support the first back frame member 105 and the second back frame member 105. A cup holder apparatus 131 extends substantially vertically between the first back frame member 105 and the second back frame member 105.

FIG. 5 additionally illustrates that the stroller 100 is in a closed position by which the expandable base member 101 has been retracted such that the upper ends of the first and second front frame member 111 has become connected to the first and second back frame member 105 respectively.

Stroller 100 may be folded and unfolded for easy storage. FIG. 5 illustrates the stroller 100 in an unfolded position.

Figure 6:
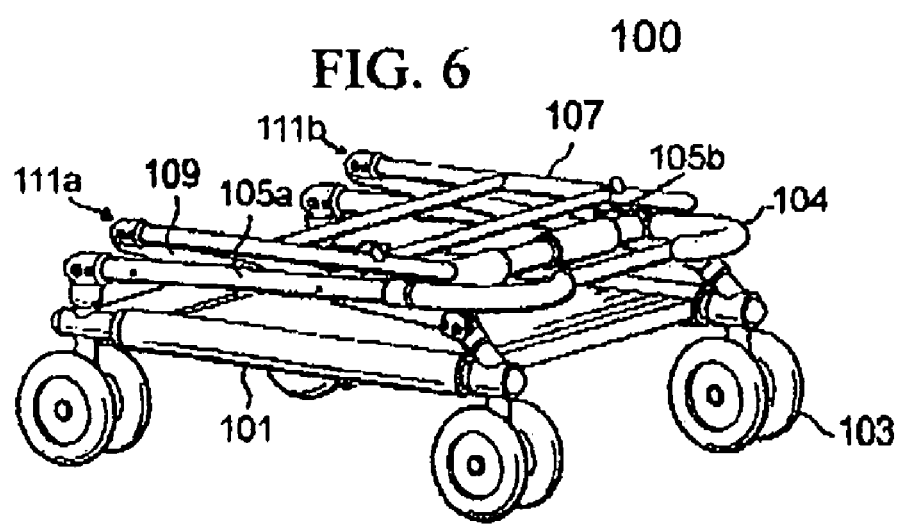
FIG. 6 illustrates a perspective view of the baby stroller in a folded position without the seat and back support.

FIG. 6 illustrates the stroller 100 in a folded position without the seat member 113 and back support member 115, and without the storage basket.

FIG. 6 illustrates that the front frame member and the second front frame member 111 includes the upper section 107 which has been pivoted on to the lower section 109 which is shown over the expandable base member 101. The first back frame member 105 and the second back frame member 105 have been folded down and positioned over the wheel member 103.

Figure 7:
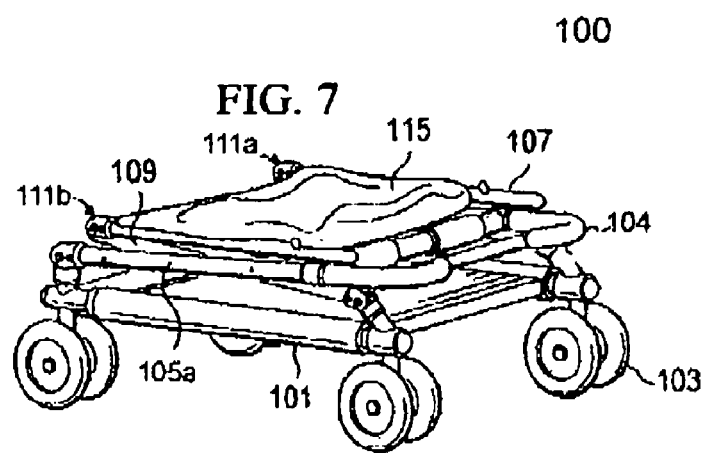
FIG. 7 illustrates a perspective view of the baby stroller in the folded position with the seat and back support.

FIG. 7 illustrates the stroller 100 in a folded position with the seat member 113 and back support member 115.

FIG. 7 illustrates that the front frame member and the second front frame member 111 includes the upper section 107 which has been pivoted on to the lower section 109 which is shown over the expandable base member 101. The first back frame member 105 and the second back frame member 105 have been pivoted and folded down and positioned over the wheel member 103.

Figure 8:
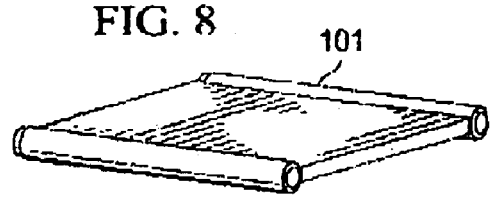
FIG. 8 illustrates a perspective view of the expandable base member in a retracted position.

FIG. 8 illustrates the expandable base member 101 in a retracted position.

Figure 9:
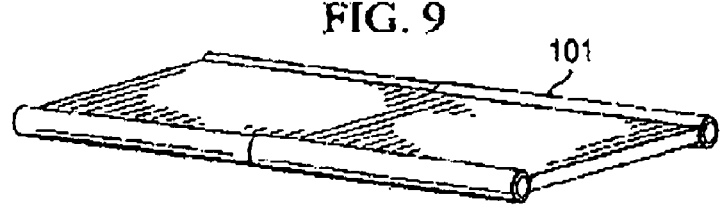
FIG. 9 illustrates a perspective view of the expandable base member in an expanded position.

FIG. 9 illustrates the expandable base member 101 in an expanded position.

Figure 10:
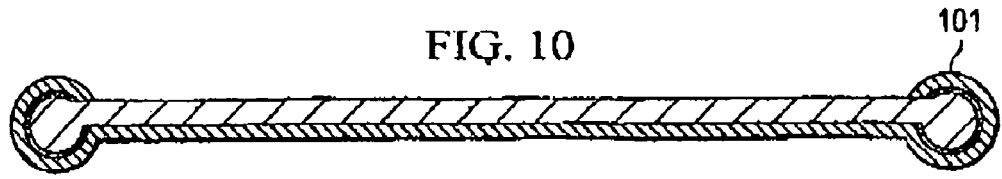
FIG. 10 illustrates a cross-sectional view of the expandable base member.

FIG. 10 illustrates a side view of the expandable base member 101 and the wheel member 103.

It should be understood that the teachings of the present invention can be applied to strollers which accommodate multiple users for example twin, triplet and the like, seats that are adapted to be snapped into the stroller frame, travel systems, prams etc.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed.

The invention claimed is:

1. A stroller for carrying a user, comprising:
   a first and second front frame member for supporting a seat and back support member
   a first and second back frame member being connected to the first and second front frame member;
   an expandable base member which connects between the first and second front frame member and the first and second back frame member;
   an expandable basket which connects between the first and second front frame member and the first and second back frame member, comprised of two expanpdable side panels, a front panel, a back panel; and a bottom panel which runs parallel to, and above the expandable base member;
   wherein the expandable frame member moves between an extended and a retracted position to provide a storage area.

2. A stroller for carrying a user as in claim 1, wherein the first and second back frame member includes handles.

3. A stroller for carrying a user as in claim 1, wherein the first and second front frame members include an upper section and a lower section.

4. A stroller for carrying a user as in claim 3, wherein the upper section pivots with respect to the lower section.

5. A stroller for carrying a user as in claim 1, wherein the first and second back frame members pivot with respect to the extendable base member.

6. A stroller for carrying a user as in claim 1. wherein the first and second front frame members pivot with respect to the extendable base member.

* * * * *